United States Patent
Newkirk

(10) Patent No.: US 6,785,046 B2
(45) Date of Patent: *Aug. 31, 2004

(54) ZOOM MONOCULAR AND VIEWING SCREEN

(76) Inventor: Darrel D. Newkirk, 2737 N. 102 St., Kansas City, KS (US) 66190

( * ) Notice: Subject to any disclaimer, the term of this patent is extended or adjusted under 35 U.S.C. 154(b) by 7 days.

This patent is subject to a terminal disclaimer.

(21) Appl. No.: 10/171,565

(22) Filed: Jun. 12, 2002

(65) Prior Publication Data

US 2003/0231386 A1 Dec. 18, 2003

(51) Int. Cl.⁷ .............................................. G02B 23/00
(52) U.S. Cl. ..................... 359/409; 359/399; 359/407; 359/630; 359/632
(58) Field of Search ................. 359/399, 407, 359/409, 432, 477, 632, 630

(56) References Cited

U.S. PATENT DOCUMENTS

| | | | | |
|---|---|---|---|---|
| 5,251,333 A | * | 10/1993 | Tsook ............................. | 2/6.2 |
| 5,486,841 A | * | 1/1996 | Hara et al. ...................... | 345/8 |
| 5,579,165 A | * | 11/1996 | Michel et al. ............... | 359/630 |
| 6,115,846 A | * | 9/2000 | Truesdale ................... | 2/209.13 |
| 6,332,685 B2 | * | 12/2001 | Seifert ......................... | 359/600 |
| 6,392,798 B1 | * | 5/2002 | Newkirk ...................... | 359/409 |

* cited by examiner

*Primary Examiner*—Audrey Chang
*Assistant Examiner*—Denise S. Allen
(74) *Attorney, Agent, or Firm*—Hovey Williams LLP

(57) ABSTRACT

A viewing device (10) adapted to be held at eye level by an apparatus (14) comprises a housing (16) designed to fit within a tray (12) of the apparatus (14), two eyepieces (22) mounted to a proximal end (24) of the housing, a magnification mechanism (26), and a focus mechanism (28). The device (10) also includes an objective lens (18) and a video screen (19) mounted to a distal end (20) of the housing (16). The housing (16) preferably includes a substantially flat bottom (30) and two substantially flat sides (32) and is preferably secured to the tray (12) by a threaded fastener (36). The eyepieces (22) are preferably flexible and padded to provide a comfortable fit. The eyepieces (22) may be either contoured or substantially flat. The contoured eyepieces (22) fit against a user's face. The substantially flat eyepieces (22) fit against the user's eyeglasses.

20 Claims, 3 Drawing Sheets

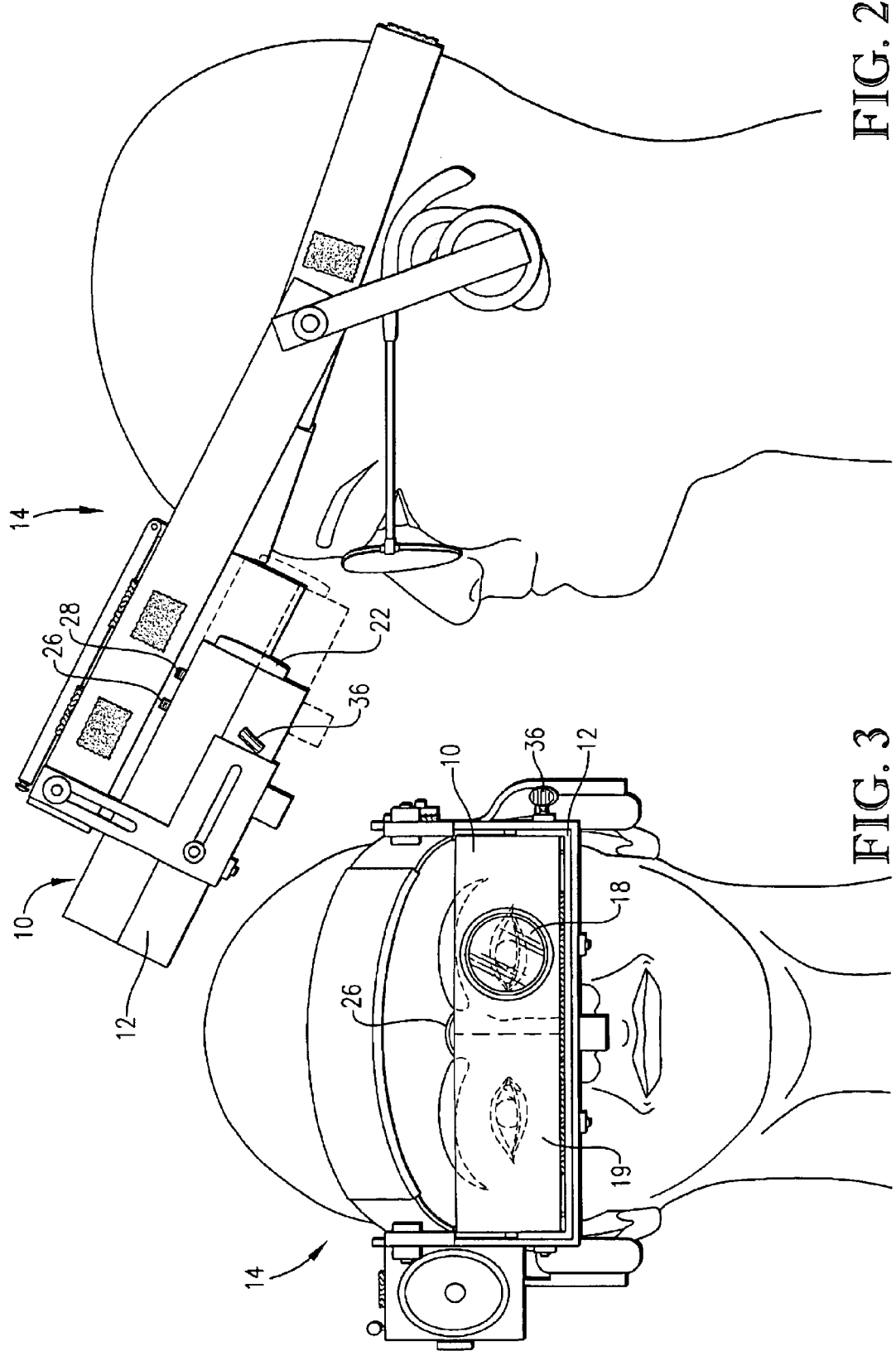

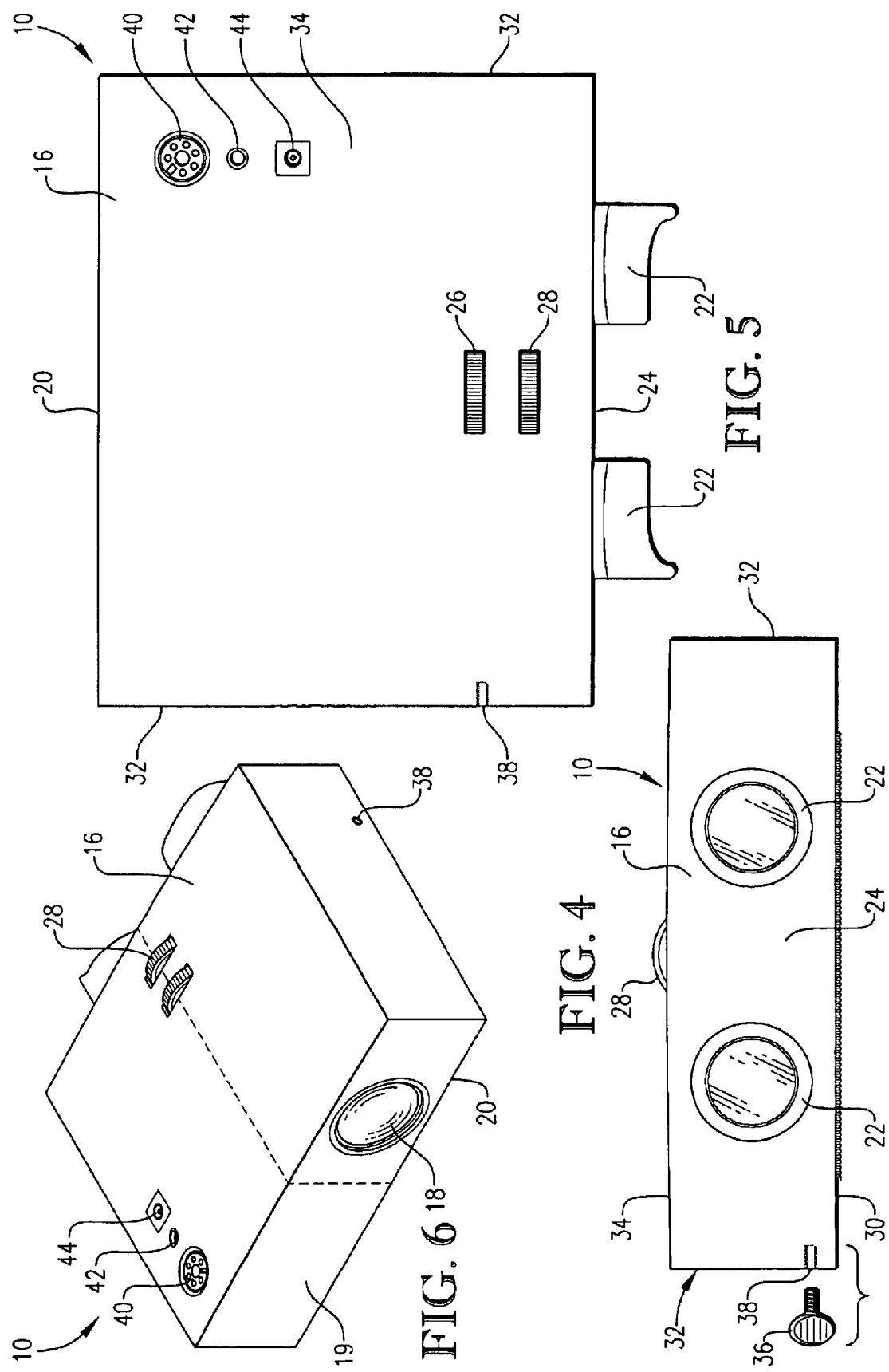

ZOOM MONOCULAR AND VIEWING SCREEN

BACKGROUND OF THE INVENTION

1. Field of the Invention

The present invention relates to viewing devices. More particularly, the present invention relates to a viewing device including a zoom monocular and a video screen and adapted to be held at eye level by an apparatus.

2. Description of Prior Art

Television broadcasts of sporting events and scoreboard mounted screens typically include features, such as instant replay and player statistics. To enjoy such features people must either carry a television set to the event or constantly look away from the event and at the scoreboard.

While a person may be sitting one hundred feet away from the event, televisions are typically held within a foot or two of a person's eyes. Glancing between the event and the television requires a person to constantly change their focal point, causing eye strain and fatigue. Such effort greatly diminishes the person's enjoyment of the event or vice versa.

The scoreboard may or may not pose a similar focal point problem; however, a person typically cannot look at both the event and the scoreboard simultaneously. Therefore, while moving their eyes between the event and the scoreboard, a person may miss an important portion of the event.

Additionally, persons attending sporting events often make use of binoculars to assist in their viewing of the event. Binoculars are most often simply hung about the user's neck and shoulders using a conventional strap. This means that each time binocular-assisted viewing is desired, the binoculars must be manually grasped, moved to eye level, and held in place.

In many cases, the effort required to use binoculars quickly leads to frustration and non-use. Rather than go through all of the steps required for binocular use, event attendees often decide that it is more enjoyable to forego their use altogether.

Furthermore, it is not practical to use binoculars and televisions or scoreboards simultaneously. Using two such items not only requires both hands, but also includes each of the problems discussed above.

Recently, an apparatus has been developed to hold viewing devices, such as binoculars and video screens at or near eye level, even when the devices are not in use. However, currently available viewing devices do not properly fit into the apparatus, and therefore cannot be effectively supported by the apparatus.

Accordingly, there is a need for improved viewing devices that overcome the limitations of the prior art.

SUMMARY OF THE INVENTION

The present invention overcomes the above-identified problems and provides a distinct advance in the art of viewing devices. More particularly, the present invention provides a viewing device including a zoom monocular and a video screen and adapted to be held at eye level by an apparatus having a tray that can be positioned below a user's eyes. The device broadly comprises a housing designed to fit within the tray of the apparatus, an objective lens mounted to a distal end of the housing, the video screen mounted to the distal end of the housing, two eyepieces mounted to a proximal end of the housing, a manual magnification mechanism operable through the housing, and a manual focus mechanism operable through the housing. The housing seats within the tray and preferably has a substantially flat bottom and two substantially flat sides.

The housing is preferably secured to the tray by a threaded fastener, such as a bolt or a screw. The fastener is driven through the tray into a threaded hole in the housing. The fastener and the hole may be any size, but the fastener is preferably either a wing-type or a knob-type allowing the user to attach and detach the device without tools.

The objective lens is preferably coated with an anti-fog material as is typically done with commonly available binoculars and rifle scopes. The objective lens is preferably sealed within the distal end of the housing such that water is prevented from entering the housing.

The screen is preferably operable to display a color image so that a user wearing the apparatus may view the image. The screen may accept digital or analog signals representative of the image through a video signal connector. As such, the screen may act as a monitor for and accept signals from a computer or video game. The screen may also accept signals from external tuners, video cassette recorders (VCRs), and digital video disc (DVD) players.

Together, the objective lens and one of the eyepieces form the zoom monocular allowing the user to view a sporting event at a magnification of his or her choosing. The screen and one of the eyepieces allow the user to view instant replays and/or player statistics, while watching the event through the objective lens. It can be seen that the user may watch both the event and the screen at the same time without moving his or her head or changing focal points.

The eyepieces are preferably flexible and padded to provide a comfortable fit. The eyepieces may be either contoured or substantially flat. The contoured eyepieces are designed to fit against the user's face and preferably completely surround each of the user's eyes in order to block out stray light. Therefore, the contoured eyepieces may extend rearwardly of the proximal end of the housing by as much as two inches. The substantially flat eyepieces are designed to fit against the user's eyeglasses, and therefore preferably do not extend beyond the housing more than one half inch.

The magnification mechanism and the focus mechanism preferably operate like those typically found on commonly available binoculars and allow the user to adjust magnification and focus of images seen through the device. The magnification mechanism and the focus mechanism preferably extend through and are preferably sealed to a top surface of the housing such that water is prevented from entering the housing.

In use, the user secures the device within the tray using the fastener. The user then puts the apparatus on his or her head and adjusts the apparatus to get a comfortable fit. The user may also be required to connect a cable to the video signal connector in order to use the device. The user may use the device by lowering the tray so that the device is at eye level. Alternatively, the user may discontinue use of the device by raising the tray so that the device is above eye level.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein:

FIG. 2 is another side elevation view of the device of FIG. 1 being held above eye level by the apparatus;

FIG. 3 is a front elevation view of the device of FIG. 1 being held at eye level by the apparatus;

FIG. 4 is a rear elevation view of the device of FIG. 1;

FIG. 5 is a plan view of the device with contoured eyepieces; and

FIG. 6 is a perspective view of the device of FIG. 5

DETAILED DESCRIPTION OF A PREFERRED EMBODIMENT

Figure 1:
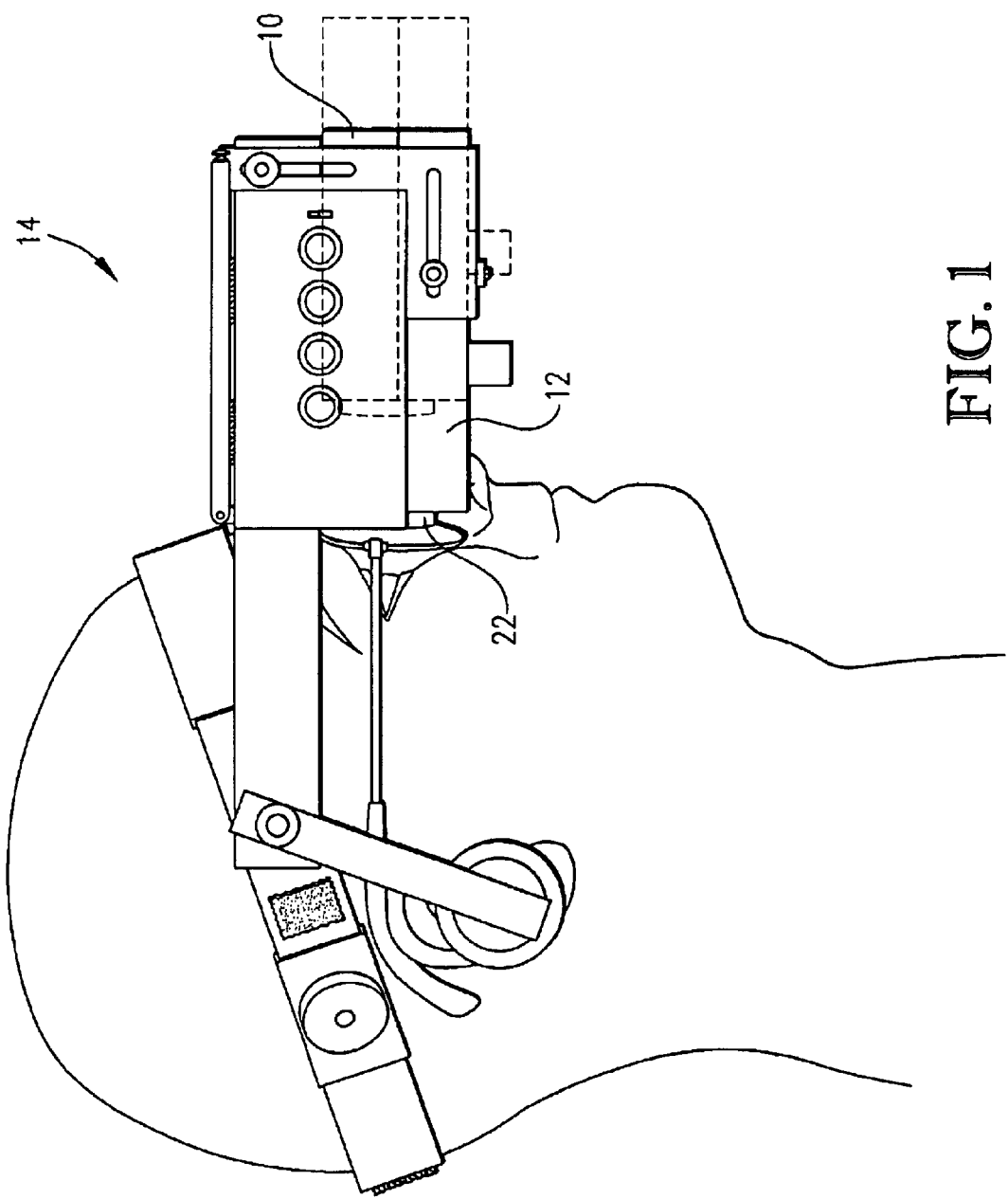
FIG. 1 is a side elevation view of a viewing device with substantially flat eyepieces constructed in accordance with the present invention being held at eye level by an apparatus.

Referring to FIG. 1, a viewing device 10 constructed in accordance with the present invention is illustrated resting in a tray 12 of an apparatus 14 such as that illustrated in U.S. Pat. No. 6,392,798 incorporated herein by reference. The apparatus 14 is designed to hold the device 10 at eye level when a user wishes to use the device 10. Additionally, as shown in FIG. 2, the apparatus 14 is designed to hold the device 10 above eye level when the user wishes to not use the device 10.

The tray 12 preferably slides within the apparatus 14 allowing the user to move the device 10 closer to or away from his or her face. Additionally, the tray 12 preferably may be adjusted up and down in order to hold the device 10 at eye level for different users. The tray 12 is preferably approximately six and one half inches wide, approximately four and one half inches deep, and approximately one inch tall.

Referring also to FIGS. 3–5, the device 10 broadly comprises a housing 16 designed to fit within the tray 12, an objective lens 18 mounted to a distal end 20 of the housing 16, a video screen 19 mounted to the distal end 20 of the housing 16, two eyepieces 22 mounted to a proximal end 24 of the housing 16, a manual magnification mechanism 26 operable through the housing 16, and a manual focus mechanism 28 operable through the housing 16. The device 10 is designed to be lightweight in order to not overload the tray 12 and insure that the apparatus 14 is comfortable to wear. Therefore, the device 10 preferably weighs between one half pound and one pound, but may weigh up to two pounds.

The housing 16 is preferably approximately six and one half inches wide, approximately four and one half inches deep, and approximately two inches tall. The housing 16 preferably has a substantially flat bottom 30 and two substantially flats ides 32. As shown, the housing 16 seats within the tray 12; however, the housing 16 may extend above, forward, and/or rearward of the tray 12. The distal end 20, the proximal end 24, and a top surface 34 may be substantially flat or contoured, since they do not contact the tray 12.

The housing 16 is preferably secured to the tray 12 by a threaded fastener 36, such as a bolt or a screw. The fastener 36 may be driven through the tray 12 into a threaded hole 38 in the housing 16. The fastener 36 and the hole 38 may be any size, but the fastener 36 is preferably either a wing-type or a knob-type allowing the user to attach and detach the device 10 without tools. While using the fastener 36 and the hole 38 is the preferred method of securing the device 10 to the tray 12, other methods may be used, such as using velcro or straps.

The objective lens 18 is preferably coated with an anti-fog material as is typically done with commonly available binoculars and rifle scopes. The objective lens 18 is preferably sealed within the distal end 20 of the housing 16 such that water is prevented from entering the housing 16. The objective lens 18 is preferably approximately one and three quarter inched in diameter, but may be as small as one inch in diameter. Together, the objective lens 18 and one of the eyepieces 22 make up the zoom monocular The screen 19 is preferably operable to display a color image so that a user wearing the apparatus 14 may view the image. The screen 19 is preferably a color LCD screen approximately three and one quarter inches wide and approximately two inches tall. The screen 19 may be mounted within the housing 16 or may form a part of the distal end 20 of the housing 16.

The screen 19 may accept digital or analog signals representative of the image through a video signal connector 40. As such, the screen 19 may act as a monitor for and accept signals from a computer or video game. The screen 19 may also accept signals from external tuners, video cassette recorders (VCRs), and digital video disc (DVD) players.

Therefore, the screen 19 may be used to watch live television broadcasts, closed circuit broadcasts, and/or recorded video programs. Additionally, the screen 19 may be used as a monitor for a computer and/or to play video games. Furthermore, the screen 19 may be used to display dialogue to actors, lyrics to singers, and/or a speech to a speaker.

Alternatively, the device 10 may receive signals representative of the image through an antenna. In this case, the device 10 may include signal reception circuitry to allow the device 10 to tune-in a television broadcast or other signal. The device 10 may also include an audio output connector 42 allowing the device 10 to supply audio signals to the apparatus 14, a pair of headphones, or another speaker arrangement.

The eyepieces 22 are preferably flexible and padded to provide a comfortable fit. The eyepieces 22 may be either contoured or substantially flat. The contoured eyepieces 22 are designed to fit against the user's face and preferably completely surround each of the user's eyes in order to block out stray light. Therefore, the contoured eyepieces 22 may extend rearwardly of the proximal end 24 of the housing 16 by as much as two inches. The substantially flat eyepieces 22 are designed to fit against the user's eyeglasses, and therefore preferably do not extend beyond the housing 16 more than one half inch.

The magnification mechanism 26 preferably operates like those typically found on commonly available binoculars and is preferably a magnification wheel that allows the user to adjust magnification of objects seen through the objective lens 18. The magnification mechanism 26 preferably extends through and is preferably sealed to the top surface 34 of the housing 16 such that water is prevented from entering the housing 16.

With the magnification mechanism 26, the device 10 may be used as long range binoculars, such as for use at sporting events, concerts, performances, and other events. In this case, the magnification mechanism 26 may adjust magnification of the objects between eight power magnification and twenty power magnification.

Alternatively, the device 10 may be used as a short range magnifier, such as for use when reading, sewing, woodworking, and other hobbies. In this case, the magnification mechanism 26 may adjust magnification of the objects between two power magnification and eight power magnification.

The focus mechanism 28 preferably operates like those typically found on commonly available binoculars and is preferably a focus wheel that allows the user to adjust focus of the image and/or the objects. The focus mechanism 28 preferably extends through and is preferably sealed to the top surface 34 of the housing 16 such that water is prevented from entering the housing 16.

The device 10 may include an integral power source, such as a battery. Alternatively, the device 10 may include a power connector 44 through which the device 10 receives power from the apparatus 14 or another source.

In use, the user secures the device 10 within the tray 12 using the fastener 36. The user then puts the apparatus 14 on his or her head and adjusts the apparatus 14 to get a comfortable fit. The user may also be required to connect a cable to the video signal connector 40, the audio output connector 42, and/or the power connector 44 in order to use the device 10. The user may use the device 10 by lowering the tray 12 so that the device 10 is at eye level, as shown in FIG. 1. Alternatively, the user may discontinue use of the device 10 by raising the tray 12 so that the device 10 is above eye level, as shown in FIG. 2.

While the present invention has been described above, it is understood that other dimensions can be substituted. Additionally, other magnification powers can be used. Furthermore, the magnification mechanism 26 might also magnify images displayed on the screen 19. The device 10 might include two focus mechanisms 28, a first focus mechanism for objects viewed through the objective lens 18 and a second focus mechanism for images viewed on the screen 19. While the screen 19 is shown to the right of the objective lens 18, they may be swapped such that the screen 19 is to the left of the objective lens 18. Finally, the magnification mechanism 26 and/or the focus mechanism 28 may be operable through the bottom 30 of the housing 16. These and other minor modifications are within the scope of the present invention.

Additionally, it may be advantageous for the device 10 to only be used to view objects through the objective lens 18 and may not include the screen 19. Alternatively, it may be advantageous for the device 10 to only be used to view images displayed on the screen 19 and may not include the objective lens 18. In either of these cases, the device 10 may then only occupy one half of the tray 12 leaving the other half of the tray 12 vacant.

Furthermore, the device 10 may include a cover for covering the objective lens 18. The cover may slide along the distal end 20 of the housing 16. The user wishes to use the objective lens 18, he or she may slide the cover over the screen 19 such that the objective lens 18 is exposed. Alternatively, when the user does not wish to use the objective lens 18, he or she may slide the cover over the objective lens 18 such that the objective lens 18 is protected. As such, the cover is preferably approximately half the width of and slidably affixed to the housing 16.

Having thus described a preferred embodiment of the invention, what is claimed as new and desired to be protected by Letters Patent includes the following:

1. A viewing device comprising:
    a housing;
    one objective lens mounted to a distal end of the housing for viewing a live event with a first one of a user's eyes;
    a video screen mounted to the distal end of the housing and operable to display an image which may be viewed with a second one of the user's eyes;
    two eyepieces each mounted to a proximal end of the housing; and
    wherein the objective lens and the video screen are positioned side-by-side such that the objective lens and the video screen do not interfere with each other.

2. The device as set forth in claim 1, wherein the housing includes a substantially flat bottom and two substantially flat sides.

3. The device as set forth in claim 1, further including a fastener hole operable to accept a fastener.

4. The device as set forth in claim 1, wherein the screen is selected from the group consisting of: a television screen and a computer monitor.

5. The device as set forth in claim 1, wherein the screen is further operable to display the image in color.

6. The device as set forth in claim 1, wherein the eyepieces are contoured to comfortably fit against a user's face.

7. The device as set forth in claim 1, wherein the eyepieces are substantially flat to fit against a user's eyeglasses.

8. The device as set forth in claim 1, wherein the eyepieces are flexible and padded.

9. The device as set forth in claim 1, wherein the device further includes a video connector operable to accept signals representative of the image.

10. The device as set forth in claim 1, further including a magnification mechanism operable to allow the user to adjust magnification of objects seen through the objective lens.

11. The device as set forth in claim 10, wherein the magnification mechanism is operable to allow the user to adjust magnification between eight power magnification and twenty power magnification.

12. The device as set forth in claim 10, wherein the magnification mechanism is operable to allow the user to adjust magnification between two power magnification and eight power magnification.

13. A viewing device adapted to be held at eye level by an apparatus, the device comprising:
    a housing with at least three substantially flat sides and operable to fit within a tray of the apparatus;
    a fastener hole in one of the sides operable to accept a fastener thereby securing the housing to the tray;
    an objective lens mounted to a distal end of the housing for viewing a live event with a first one of a user's eyes;
    a video screen mounted to the distal end of the housing and operable to display a color image which may be viewed with a second one of the user's eyes;
    a video connector mounted to the housing and operable to accept signals representative of the image;
    two padded eyepieces each mounted to a proximal end of the housing;
    a magnification mechanism operable to allow the user to adjust magnification of objects seen through the objective lens; and
    a manual focus mechanism operable through the housing.

14. The device as set forth in claim 13, wherein the eyepieces are contoured to comfortably fit against a user's face.

15. The device as set forth in claim 13, wherein the eyepieces are substantially flat to fit against a user's eyeglasses.

16. The device as set forth in claim 13, wherein the magnification mechanism is operable to allow the user to adjust magnification between eight power magnification and twenty power magnification.

17. The device as set forth in claim 13, wherein the magnification mechanism is operable to allow the user to adjust magnification between two power magnification and eight power magnification.

18. An assembly comprising:
    a viewing device adapted to be held at eye level, the device including— a housing, a removable attachment mechanism operable to be coupled with the housing, an objective lenses mounted to a distal end of the housing, and an eyepiece mounted to a proximal end of the housing; and an apparatus for holding the device at eye level of a user, the apparatus including— a pair of elongated arms each having a first and a second end, an attachment for mounting the first ends on opposite sides of the user's head with the arms extending forwardly and the second ends spaced from the user's head, an adjustment bracket extending between and secured adjacent the second ends, a tray supported upon the bracket forwardly of the user's head, the tray being adapted to hold the device from below, and wherein the arms are swingable between a use position where the device is at the user's eye level and a crosspiece of the tray is below the user's eye level, and an elevated position where the device is moved out of the user's field of vision.

19. An assembly comprising:

a viewing device adapted to be held at eye level, the device including— a housing, a removable attachment mechanism operable to be coupled with the housing, a video screen mounted to a distal end of the housing and operable to display an image, and an eyepiece mounted to a proximal end of the housing; and an apparatus for holding the device at eye level of a user, the apparatus including— a pair of elongated arms each having a first and a second end, an attachment for mounting the first ends on opposite sides of the user's head with the arms extending forwardly and the second ends spaced from the user's head, an adjustment bracket extending between and secured adjacent the second ends, a tray supported upon the bracket forwardly of the user's head, the tray having a nose-receiving recess in a rearward surface and adapted to hold the device from below, and wherein the arms are swingable between a use position where the device is at the user's eye level and a crosspiece of the tray is below the user's eye level, and an elevated position where the device is moved out of the user's field of vision.

20. An assembly comprising:

a viewing device adapted to be held at eye level, the device including— a housing with at least three substantially flat sides, a fastener hole in one of the sides operable to accept a fastener, an objective lens mounted to a distal end of the housing for viewing a live event with a first one of a user's eyes, a video screen mounted to the distal end of the housing and operable to display a color image which may be viewed with a second one of the user's eyes, a video connector mounted to the housing and operable to accept signals representative of the image, two padded eyepieces each mounted to a proximal end of the housing, a magnification mechanism operable to allow the user to adjust magnification of objects seen through the objective lens, and a manual focus mechanism operable through the housing; and an apparatus for holding the device at eye level of the user, the apparatus including— a pair of elongated arms each having a first and a second end, an attachment for mounting the first ends on opposite sides of the user's head with the arms extending forwardly and the second ends spaced from the user's head, an adjustment bracket extending between and secured adjacent the second ends, a tray supported upon the bracket forwardly of the user's head, the tray having a nose-receiving recess in a rearward surface and adapted to hold the device from below, and wherein the arms are swingable between a use position where the device is at the user's eye level and a crosspiece of the tray is below the user's eye level, and an elevated position where the device is moved out of the user's field of vision.

* * * * *